(12) United States Patent
Bikshandi et al.

(10) Patent No.: US 9,372,678 B2
(45) Date of Patent: Jun. 21, 2016

(54) COMPILER OPTIMIZATION FOR COMPLEX EXPONENTIAL CALCULATIONS

(71) Applicant: Intel Corporation, Santa Clara, CA (US)

(72) Inventors: Ganesh Bikshandi, Bangalore (IN); Daehyun Kim, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/129,438

(22) PCT Filed: Jun. 14, 2013

(86) PCT No.: PCT/US2013/045782
§ 371 (c)(1),
(2) Date: Dec. 26, 2013

(87) PCT Pub. No.: WO2014/200501
PCT Pub. Date: Dec. 18, 2014

(65) Prior Publication Data
US 2016/0110171 A1  Apr. 21, 2016

(51) Int. Cl.
*G06F 9/45* (2006.01)
(52) U.S. Cl.
CPC .............. *G06F 8/443* (2013.01); *G06F 8/4434* (2013.01)
(58) Field of Classification Search
CPC ..... G06F 8/4434; G06F 8/4441; G06F 8/447; G06F 8/443
USPC ................................................ 717/140, 151
See application file for complete search history.

(56) References Cited

U.S. PATENT DOCUMENTS

| 6,341,370 | B1 * | 1/2002 | Tirumalai | G06F 8/4452 712/207 |
| 6,745,384 | B1 * | 6/2004 | Biggerstaff | G06F 8/4441 712/203 |
| 7,185,330 | B1 | 2/2007 | Khu | |
| 7,549,146 | B2 * | 6/2009 | Tian | G06F 8/4441 717/148 |
| 2006/0277529 | A1 | 12/2006 | Michimoto et al. | |
| 2008/0034360 | A1 | 2/2008 | Bodin et al. | |

(Continued)

OTHER PUBLICATIONS

International Search Report and Written Opinion received for International Application No. PCT/US2013/045782, mailed Mar. 28, 2014, 9 pages.

(Continued)

*Primary Examiner* — Chameli Das
(74) *Attorney, Agent, or Firm* — Barnes & Thornburg LLP

(57) ABSTRACT

Technologies for optimizing complex exponential calculations include a computing device with optimizing compiler. The compiler parses source code, optimizes the parsed representation of the source code, and generates output code. During optimization, the compiler identifies a loop in the source code including a call to the exponential function having an argument that is a loop-invariant complex number multiplied by the loop index variable. The compiler tiles the loop to generate a pair of nested loops. The compiler generates code to pre-compute the exponential function and store the resulting values in a pair of coefficient arrays. The size of each coefficient array may be equal to the square root of the number of loop iterations. The compiler applies rewrite rules to replace the exponential function call with a multiplicative expression of one element from each of the coefficient arrays. Other embodiments are described and claimed.

19 Claims, 5 Drawing Sheets

(56) References Cited

U.S. PATENT DOCUMENTS

| | | |
|---|---|---|
| 2011/0088020 A1 | 4/2011 | Eichenberger et al. |
| 2011/0271265 A1 | 11/2011 | Drozdov et al. |
| 2012/0167069 A1* | 6/2012 | Lin ................... G06F 8/4441 717/160 |
| 2013/0055224 A1* | 2/2013 | Ravi .................. G06F 8/4441 717/149 |

OTHER PUBLICATIONS

Kaiser, "Loop Optimization Techniques on Multi-Issue Architectures," Dissertation for Doctor of Philosophy, 1994, 194 pages.

"Compiler," Wikipedia, The Free Encyclopedia, retrieved from: <http://en.wikipedia.org/w/index.php?title=Compiler&oldid=528120010>, edited Dec. 15, 2012, 9 pages.

"Optimizing compiler," Wikipedia, The Free Encyclopedia, retrieved from: <http://en.wikipedia.org/w/index.php?title=Optimizing_compiler&oldid=517963837>, edited Oct. 15, 2012, 12 pages.

"Intrinsic function," Wikipedia, The Free Encyclopedia, retrieved from: <http://en.wikipedia.org/w/index.php?title=Intrinsic_function&oldid=498462797>, edited Jun. 20, 2012, 1 page.

* cited by examiner

```
for (int j = 0; j < N; j++) {
    complex lhs = exp(W*j);
}
```
                                                402

```
for (int m = 0; m < K₂; m++) {
    for (int n = 0; n < K₁; n++) {
        int j = n + K₁*m;
        complex lhs = exp(W*(n + K₁*m));
    }
}
```

```
for (int m = 0; m < K₂; m++) {
    for (int n = 0; n < K₁; n++) {
        int j = n + K₁*m;
        complex lhs = exp(W*n) * exp(W*K₁*m);
    }
}
```

```
for (int n = 0; n < K₁; n++) { exp₁[n] = exp(W*n); }
for (int m = 0; m < K₂; m++) { exp₂[m] = exp(W*K₁*m); } for (int m = 0; m < K₂; m++) {
    for (int n = 0; n < K₁; n++) {
        complex lhs = exp₁[n] * exp₂[m];
    }
}
```

COMPILER OPTIMIZATION FOR COMPLEX EXPONENTIAL CALCULATIONS

CROSS REFERENCE TO RELATED APPLICATIONS

This application is a national stage entry under 35 USC §371(b) of International Application No. PCT/US2013/045782, which was filed Jun. 14, 2013.

BACKGROUND

The complex exponential function, that is, $f(z)=e^z$ where z is a complex number, is an important calculation performed in many problem domains, such as signal processing and numerical simulation. Repeated calculation of the exponential function tends to be a computationally-expensive operation. For example, each calculation of the exponential function may include calls to the cos( ) and sin( ) functions. To improve performance, programmers may pre-compute the exponential function over an iteration space and store the resulting values in memory. However, for large data sets, that optimization may require excessive storage space in memory or use excessive memory bandwidth.

Typical compilers may generate code to compute the exponential function using an intrinsic function of the compiler. Compiler intrinsic functions are typically pre-programmed segments of assembly code that may or may not target particular computer architectures. Thus, intrinsic functions typically can only be optimized by the compiler at the assembly code level.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
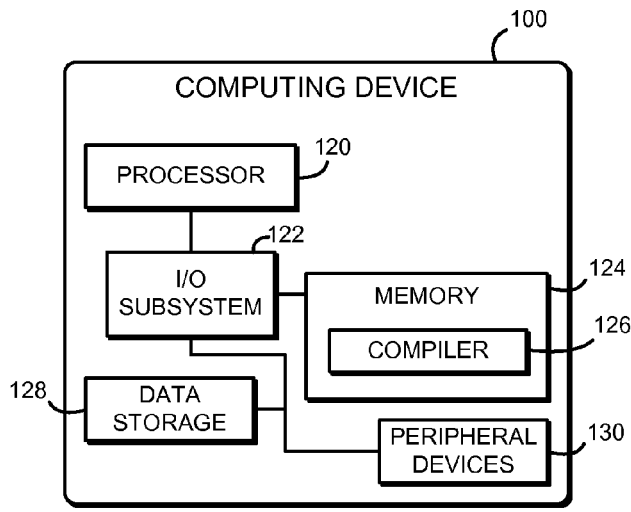
FIG. 1 is a simplified block diagram of at least one embodiment of a computing device for optimizing complex exponential calculations.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative computing device 100 for optimizing complex exponential calculations includes a processor 120, an I/O subsystem 122, and a memory 124. The memory 124 includes an optimizing compiler 126. In use, as described below, the compiler 126 is configured to optimize source code including repeated calls to a complex exponential function. The disclosed technologies allow for more efficient complex exponential calculations, which may accelerate many common mathematical kernels such as a fast Fourier transform kernel. Additionally, the disclosed technologies may facilitate further optimization of the exponential calculations, such as vectorization or parallelization.

The computing device 100 may be embodied as any type of device capable of optimizing exponential calculations and performing the functions described herein. For example, the computing device 100 may be embodied as, without limitation, a computer, a desktop computer, a workstation, a laptop computer, a notebook computer, a tablet computer, a smartphone, a distributed computing system, a multiprocessor system, a consumer electronic device, a smart appliance, and/or any other computing device capable of optimizing exponential calculations. As shown in FIG. 1, the illustrative computing device 100 includes the processor 120, the I/O subsystem 122, the memory 124, and a data storage device 128. Of course, the computing device 100 may include other or additional components, such as those commonly found in a desktop computer (e.g., various input/output devices), in other embodiments. Additionally, in some embodiments, one or more of the illustrative components may be incorporated in, or otherwise from a portion of, another component. For example, the memory 124, or portions thereof, may be incorporated in the processor 120 in some embodiments.

The processor 120 may be embodied as any type of processor currently known or developed in the future and capable of performing the functions described herein. For example, the processor may be embodied as a single or multi-core processor(s), digital signal processor, microcontroller, or other processor or processing/controlling circuit. Similarly, the memory 124 may be embodied as any type of volatile or non-volatile memory or data storage currently known or developed in the future and capable of performing the functions described herein. In operation, the memory 124 may store various data and software used during operation of the computing device 100 such as the compiler 126, operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 100. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 100, on a single integrated circuit chip.

The data storage 128 may be embodied as any type of device or devices configured for short-term or long-term storage of data such as, for example, memory devices and circuits, memory cards, hard disk drives, solid-state drives, or other data storage devices. The data storage 128 may store program files and data for the compiler 126, as well as source code files and output object and executable files. As discussed further below, the compiler 126 applies optimizations to exponential function calls as the compiler 126 translates source code into object code or executable code.

In some embodiments, the computing device 100 may also include one or more peripheral devices 130. The peripheral devices 130 may include any number of additional input/output devices, interface devices, and/or other peripheral devices. For example, in some embodiments, the peripheral devices 130 may include a display, touch screen, graphics circuitry, keyboard, mouse, speaker system, and/or other input/output devices, interface devices, and/or peripheral devices.

Figure 2:
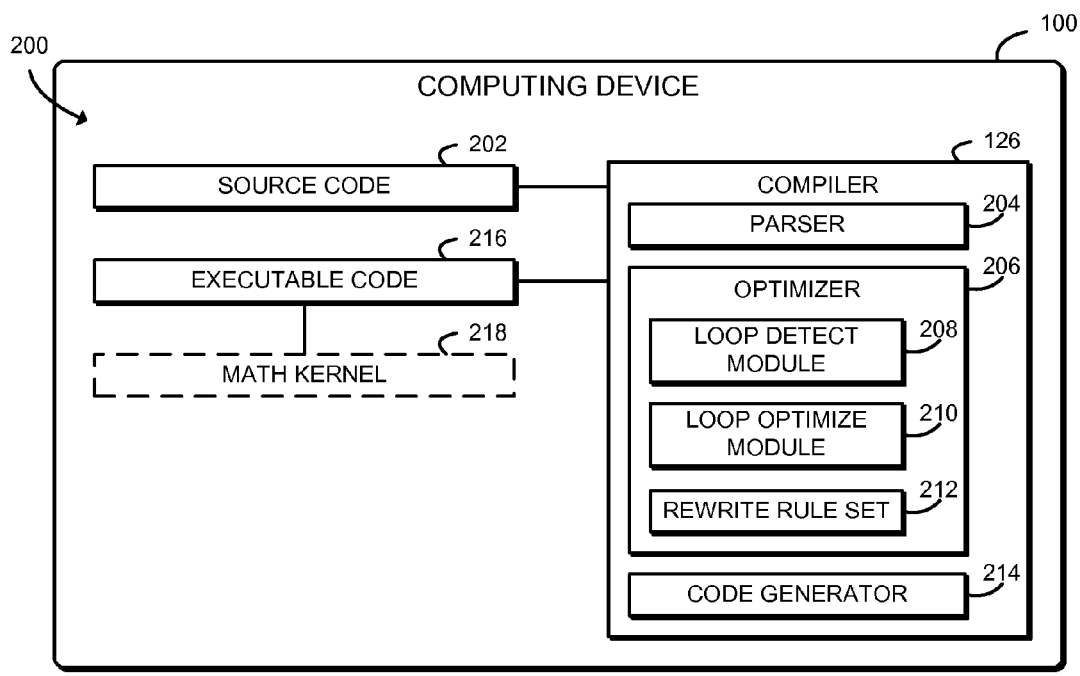
FIG. 2 is a simplified block diagram of at least one embodiment of an environment of the computing device of FIG. 1.

Referring now to FIG. 2, in one embodiment, the computing device 100 establishes an environment 200 during operation. The illustrative embodiment 200 includes source code 202, the compiler 126, executable code 216, and in some embodiments, a math kernel 218. The various modules of the environment 200 may be embodied as hardware, firmware, software, or a combination thereof.

The source code 202 includes symbols that may be translated into machine-executable code. The source code 202 may include typical source code features such executable statements, control flow statements, data structures, and the like. In particular, the source code 202 may include one or more loop constructs containing a call to a complex exponential function, as described below. The source code 202 may be embodied as C or C++ code, FORTRAN code, JAVA code, C# code, Objective C code, or any other computer code accepted by the compiler 126.

The compiler 126 is configured to process the source code 202 and produce the executable code 216. The compiler 126 may process the source code 202 in stages, for example, first parsing the source code 202 to build an intermediate representation of the source code 202, then optimizing the intermediate representation of the source code 202, and last generating executable code 216 based on the intermediate representation. In some embodiments, those functions may be performed by sub-modules, for example by a parser 204, an optimizer 206, or a code generator 214. The compiler 126 may optimize the intermediate representation by detecting code segments containing loops with calls to the complex exponential function and optimizing the detected code segment by applying a number of rewrite rules to the intermediate representation. In some embodiments, those functions may be performed by sub-modules, for example by a loop detect module 208, a loop optimize module 210, or rewrite rule set 212.

The executable code 216 includes machine-executable code generated by the compiler 126 based on the source code 202. The executable code 216 may be embodied as binary code directly executable on a computing device, binary object code that may be linked with other code to produce an executable, precompiled header files that may be incorporated into an executable, or any other output file typically produced by an optimizing compiler. The executable code 216 may be targeted to a particular computer instruction set or otherwise targeted to the architecture of a particular computing device. In some embodiments, the executable code 216 may be executable by the computing device 100 itself. In other embodiments, the executable code 216 may be executable by a target computing device other than the computing device 100 (not shown). In such embodiments, the compiler 126 may be a so-called "cross compiler."

In some embodiments, the executable code 216 may include calls to the math kernel 218. The math kernel 218 is configured to provide common mathematical calculations and service routines. For example, in some embodiments, the math kernel 218 may include a fast Fourier transform ("FFT") routine. Optimization of the executable code 216 may improve performance of code utilizing the math kernel 218.

Figure 3:
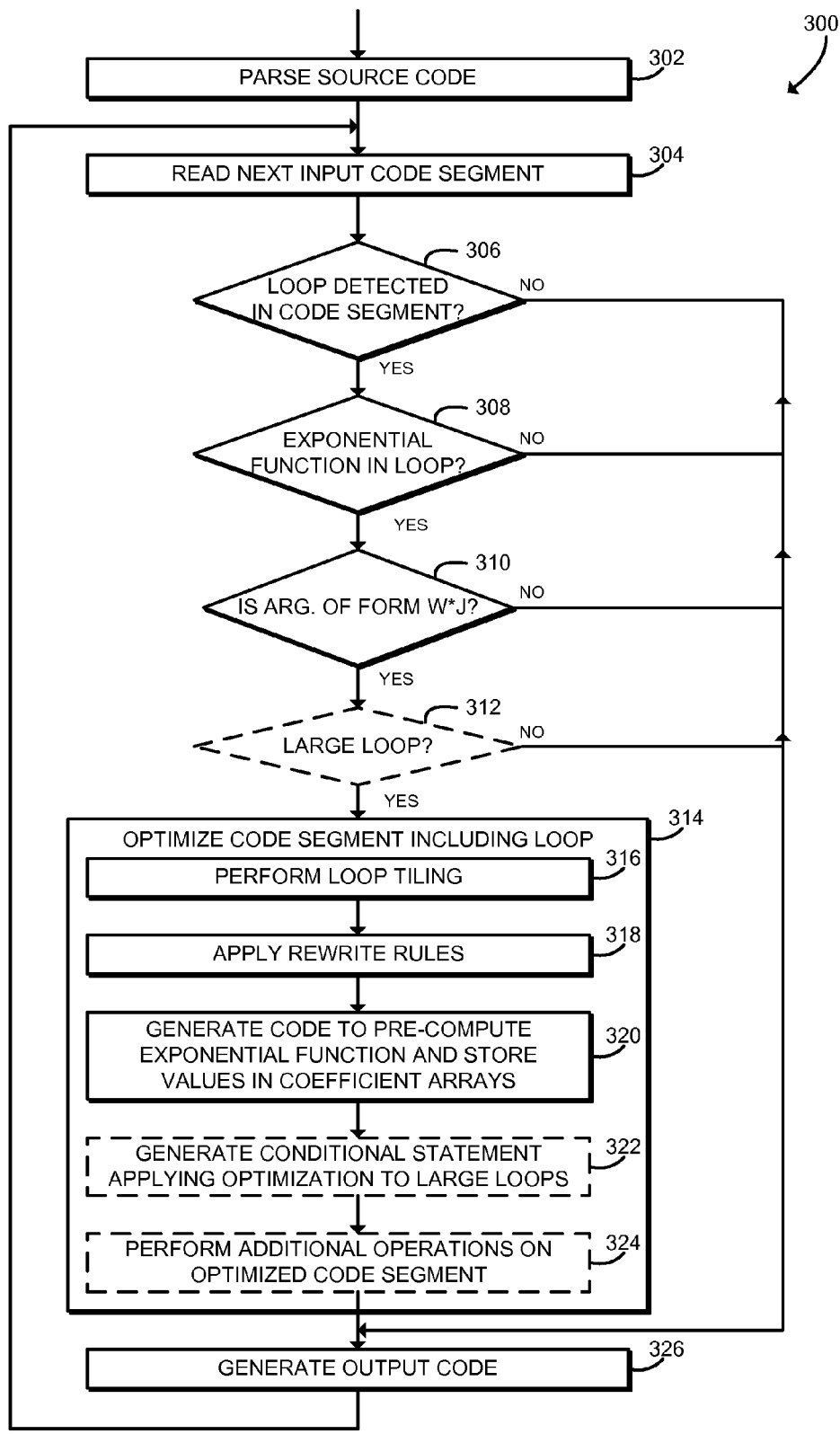
FIG. 3 is a simplified flow diagram of at least one embodiment of a method for optimized compilation of complex exponential calculations that may be executed by the computing device of FIGS. 1 and 2.

Referring now to FIG. 3, in use, the computing device 100 may execute a method 300 for optimized compilation of complex exponential calculations. The method 300 may be executed by the compiler 126 during compilation of the source code 202. The method 300 begins in block 302, in which the compiler 126 parses the source code 202. The parse stage of block 302 may generate an in-memory representation of the source code 202 that may be analyzed and modified by later stages of the compiler 126. For example, the compiler 126 may generate an abstract syntax tree ("AST") or an intermediate representation of the source code 202. The intermediate representation may be embodied as a graph structure connecting basic blocks of instructions targeting an abstract computing device.

In block 304, the computing device 100 reads an input code segment from the source code 202. As described above, the code segment is part of an in-memory representation generated by the parse stage of the compiler 126. For example, the code segment may be a node in an abstract syntax tree or a block of instructions of an intermediate representation.

In block 306, the computing device 100 determines whether the input code segment includes a loop. The method for detecting a loop may depend on the internal representation of the source code 202 produced by the parse stage. For example, given an AST representation, the computing device 100 may simply identify a loop node in the tree. Given an intermediate representation, the computing device 100 may analyze graph edges to identify groups of instructions forming a loop. If a loop is not detected, the method 300 branches to block 326, described below. If a loop is detected, the method 300 advances to block 308.

In block 308, the computing device 100 determines whether the loop includes a call to the complex exponential function. The computing device 100 may use any method for detecting such call, for example detecting a call to an intrinsic function of the compiler 126, or a call to a library function of the math kernel 218. In some embodiments, the computing device 100 may detect a sequence of instructions known to calculate the exponential function. If an exponential function is not detected, the method 300 branches to block 326, described below. If an exponential function is detected, the method 300 advances to block 310.

In block 310, the computing device 100 determines whether the argument to the exponential function is of the form W*j, that is, whether the argument is a loop-invariant complex number times the loop index. The loop-invariant complex number may be a read-only variable, a program constant, or any other value that does not change over the course of the identified loop. The loop index is the induction variable of the loop, such as a loop counter.

Figures 4A, 4B:
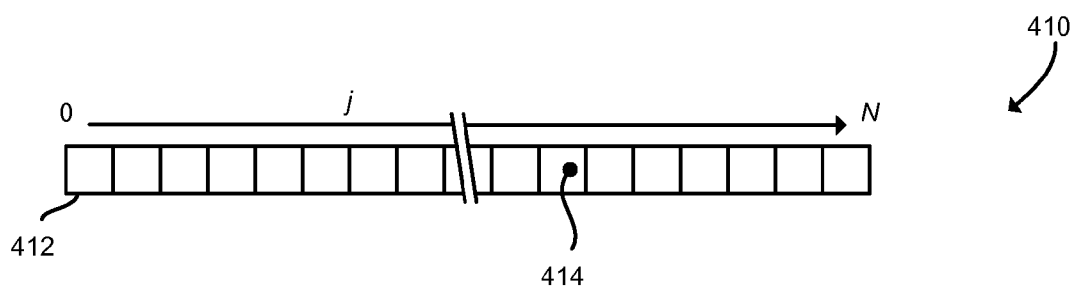
FIG. 4A illustrates example pseudocode of a complex exponential calculation.
FIG. 4B is a conceptual illustration of the iteration space of the pseudocode of FIG. 4A.

Referring now to FIG. 4A, sample pseudocode 400 illustrates a loop including a call to the exponential function that may satisfy the tests of blocks 306, 308, 310. Pseudocode 400 may represent an input code segment read by the computing device 100 or a part of an input code segment. In pseudocode 400, integer j is the induction variable, and the loop performs N iterations. Statement 402 includes a call to the exponential function exp( ). Complex variable lhs holds the result of statement 402. Identifier W is a constant complex number. Thus, the argument to exp( ) is W*j, that is, a loop-invariant complex number W times the induction variable j. Accordingly, statement 402 may be identified by the computing device 100 as satisfying the test of block 310.

Referring now to FIG. 4B, diagram 410 illustrates the iteration space of pseudocode 400. Array 412 is a single-dimensioned array including N elements indexed by variable j. In other words, each element of the array 412 represents one iteration of the loop of pseudocode 400. Accordingly, each element of the array 412, for example representative element 414, has a value equal to exp(W*j). Thus, the loop as written has a computational complexity of O(N), that is, the loop requires on the order of O(N) calls to exp( ) (and potentially sin( ) and cos( ) as well). Additionally or alternatively, if the values of the loop are precomputed and stored in memory, storage space on the order of O(N) is required. That is, the size of the array 412 is of O(N).

Referring back to FIG. 3, in block 310, if the computing device 100 determines that the argument to the exponential function is not of the form W*j, the method 300 branches to block 326, described below. If the computing device 100 determines that the argument to the exponential function is of the form W*j, the method 300 advances to block 312.

In block 312, in some embodiments the computing device 100 determines whether the detected loop is large enough for optimization. In other words, the computing device 100 determines whether the number of iterations N of the loop exceeds a minimum loop size. The minimum loop size may be based on the size of cache memory of the target computing device. Optimizing loops with iteration spaces that exceed the size of cache memory may improve performance by reducing memory bandwidth usage. In some embodiments, the minimum loop size may be exceeded when the results of all loop iterations will not fit in cache memory. For example, consider a target computing device having a thirty-two kilobyte data cache. Given that a complex number occupies eight bytes of memory, then the cache may contain at most 4,096 complex numbers. Thus, in that example, the minimum loop size may be 4,096 iterations. If the loop is not large enough for optimization, the method 300 branches to block 326, described below. If the loop is large enough for optimization, the method 300 advances to block 314. Of course, the computing device 100 may only determine the size of the iteration space in block 312 if the number of iterations is constant or otherwise determinable at compile time. If the number of iterations is dynamic or otherwise determined at runtime, the computing device may apply a default rule, for example, optimistically applying optimization.

In block 314, the computing device 100 optimizes the input code segment including the detected loop. To do so, the computing device 100 may replace the input code segment of the in-memory representation of the compiler 126 with modified code. To begin, in block 316, the computing device 100 tiles the loop. Loop tiling, also known as "strip mining," partitions the iteration space of the loop into smaller blocks—"tiles"—that may be processed more efficiently. For example, each resulting tile may fit inside cache memory of the target computing device, improving performance by reducing memory bandwidth pressure. The computing device 100 may tile the loop by replacing the loop with a pair of nested loops that iterate over the same iteration space.

Figures 5A, 5B:
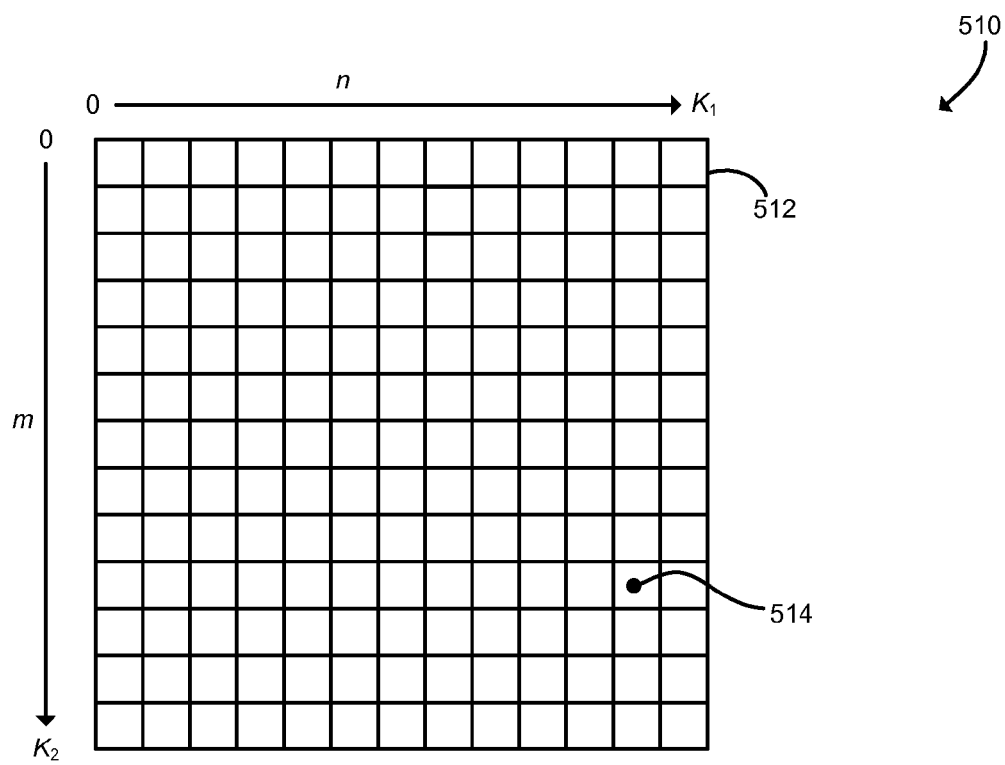
FIG. 5A illustrates example pseudocode of a loop tiling optimization disclosed herein.
FIG. 5B is a conceptual illustration of the iteration space of the pseudocode of FIG. 5A.

For example, referring now to FIG. 5A, pseudocode 500 illustrates the results of loop tiling performed on pseudocode 400 of FIG. 4A. The single loop with iteration variable j from 0 to N has been replaced by an outer loop from 0 to $K_2$ with iteration variable m and an inner loop from 0 to $K_1$ with iteration variable n. The constants $K_1$ and $K_2$ are related by the relationship:

$$K_1 K_2 = N \qquad (1)$$

Accordingly, the statement 502 included in the inner loop is executed N times, equivalent to the statement 402 of FIG. 4A. In some embodiments, $K_1$ and $K_2$ may each be equal to the square root of N, however, any positive integer values may be used for which relationship (1) holds. The value of the original iteration variable j may be calculated as $n + K_1 * m$. Thus, statement 502 is equivalent to statement 402 of FIG. 4A. The argument of the exponential function therefore may be expressed as $W*(n+K_1*m)$.

Referring now to FIG. 5B, diagram 510 illustrates the iteration space for the tiled pseudocode 500. Array 512 is a two-dimensional array having $K_1$ columns indexed by the variable n, and $K_2$ rows indexed by the variable m. Although the illustrative array 512 is a thirteen-by-thirteen square array, any size array for which relationship (1) holds may be used. Each iteration of the inner loop of pseudocode 500 corresponds to iterating through a cell in a single row of the array 512. Each iteration of the outer loop represents moving down one row in the array 512. Each element of the array 512, for example representative element 514, has a value equal to $\exp(W*(n+K_1*m))$. Because $K_1 K_2 = N$, the array 512 includes N total elements. Thus, the computational and/or space complexity of tiled pseudocode 500 remains O(N).

Referring back to FIG. 3, after tiling the loop, in block 318 the computing device 100 applies the rewrite rule set 212 to transform the exponential function call into a form more suitable for optimization. The rewrite rule set 212 is known to the compiler 126, and includes a set of input code patterns and replacement code for those input code patterns. The rewrite rules may be based on mathematical properties. For example, the rewrite rule set 212 may include:

$$e^w => \text{complex}(\cos(W), \sin(W)), \text{ where } W \text{ is a complex number} \quad (2)$$

$$e^x e^y <=> e^{x+y}, \text{ where } x,y \text{ are complex expressions} \quad (3)$$

$$e^{2\pi x} => 1, \text{ where } x \text{ is an integer valued expression} \quad (4)$$

$$e^1 => e \quad (5)$$

$$e^0 => 1 \quad (6)$$

$$x(a+b) => xa+xb \quad (7)$$

$$x \cdot 1 => x \quad (8)$$

$$x \cdot 0 => 0 \quad (9)$$

Figure 6:
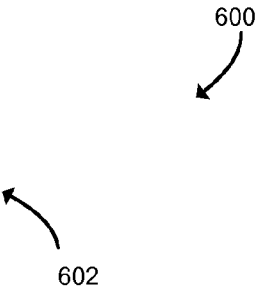
FIG. 6 illustrates example pseudocode of an optimization disclosed herein.

Referring now to FIG. 6, pseudocode 600 illustrates the results of applying the rewrite rule set 212 to pseudocode 500 of FIG. 5A. In particular, statement 602 is equivalent to statement 502 of FIG. 5A, after application of rewrite rules (7) and (3) described above. The right-hand-side of statement 602 now includes the product of two exponential function calls, exp(W*n) and exp(W*$K_1$*m).

Referring back to FIG. 3, in block 320, the computing device 100 generates code to pre-compute the values of the calls to the exponential function and store the pre-computed values in a pair of coefficient arrays. The computing device 100 also replaces the exponential function call in the inner loop with a multiplicative expression of elements of the coefficient arrays.

Figure 7A:
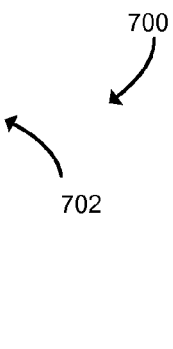
FIG. 7A illustrates example pseudocode of another optimization disclosed herein.

For example, referring now to FIG. 7A, pseudocode 700 illustrates the results of inserting code to pre-compute the results of the exponential function calls. Statements 702 define the coefficient arrays and precompute the values of the exponential function calls over the coefficient arrays. Coefficient array $exp_1$ includes $K_1$ members, corresponding to the number of columns of the iteration space of pseudocode 700 (see FIG. 5B). Similarly, array $exp_2$ includes $K_2$ members, corresponding to the number of rows of the iteration space of pseudocode 700 (see FIG. 5B). The statement 704, equivalent to statement 602 of FIG. 6, retrieves values from $exp_1$ and $exp_2$, indexed by the iteration variables n, m, respectively. Thus, because $K_1 K_2 = N$, pseudocode 700 still requires N total iterations and therefore N calls to statement 704; however, statement 704 does not include any potentially expensive calls to the exponential function exp( ).

Figure 7B:
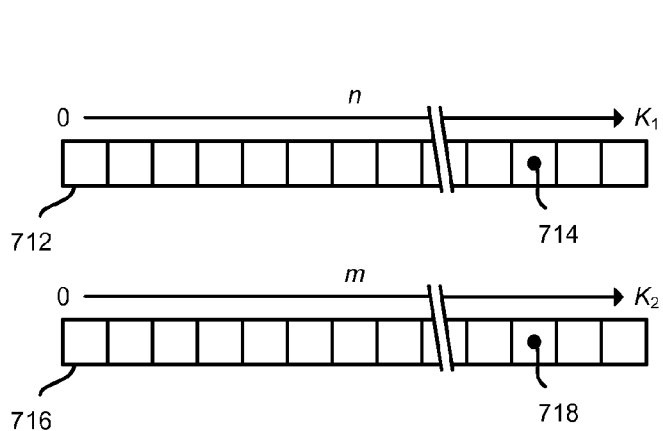
FIG. 7B is a conceptual illustration of the iteration space of the pseudocode of FIG. 7A.

Referring now to FIG. 7B, diagram 710 illustrates the iteration space of pseudocode 700. Single-dimension array 712, corresponding to $exp_1$ of pseudocode 700, includes $K_1$ elements indexed by variable n. Each element 714 of the array 712 has a value equal to exp(W*n). Single-dimension array 716, corresponding to $exp_2$ of pseudocode 700, includes $K_2$ elements indexed by variable m. Each element 718 of the array 716 has a value equal to exp(W*$K_i$*m). Thus, pre-computing the values of the arrays 712, 714 requires $K_1 + K_2$ calls to exp( ), and the total storage required for both arrays 712, 714 is $K_1 + K_2$ elements. In the illustrative embodiment, where $K_1 = K_2 = \sqrt{N}$, pre-computing the arrays 712, 714 therefore has complexity of $O(\sqrt{N})$ and the storage requirements for the arrays 712, 714 are also $O(\sqrt{N})$. The multiplication and table-lookup operations of statement 704 remain O(N); however, multiplication is typically much less computationally expensive compared to the exponential function, and the loop tiling described above may improve performance of the table lookup operations. For example, each of the arrays 712, 716 may be small enough to be resident within cache memory of the target computing device.

Referring back to FIG. 3, after generating the optimized code segment, in some embodiments, in block 322 the computing device 100 may generate a conditional statement to execute the optimized loop at runtime only for large loops. As described above in connection with block 312, this loop optimization technique may best apply to loops with many iterations, for example, to loops large enough that the resulting values do not fit in cache memory of the target computing device. However, the number of iterations may not be known at compile time. Therefore, to improve runtime performance, the compiler 126 may insert a conditional statement "wrapping" the optimized loop to test the number of iterations of the loop and execute the optimized loop when the number of iterations of the loop exceeds the minimum loop size. The compiler 126 may include the un-optimized loop as an alternate code path to be executed for smaller loops.

In some embodiments, in block 324, the computing device 100 may perform additional optimizations on the optimized code segment containing the loop. As described above, the optimized loop replaces an exponential function call with a multiply operation and a pair of table lookups, as illustrated by statement 704 of FIG. 7B. The compiler 126 may be able to perform further optimizations on those operations, for example, the compiler 126 may parallelize or vectorize the optimized loop. Those optimizations may not have been possible for the un-optimized input code segment. For example, as described above, if the input code segment called an intrinsic exp( ) function of the compiler 126, the compiler 126 may have been limited to inlining the function call and optimizing assembly language instructions. Optimization of intrinsic function calls is typically not successful.

After optimizing the code segment in block 314—or after determining not to optimize the code segment in any of blocks 306, 308, 310, 312—the computing device 100 generates output code based on the in-memory representation of the code segment. The generated code may be embodied as a list of instructions for the particular target computing device. The output code may be executable code 216, object code that may be linked to produce the executable code 216, or intermediate code that may be further processed by the compiler 126. For example, additional optimizations may be performed on the code segment in the same optimizer pass or in additional optimizer passes. After generating the output code, the method 300 loops back to block 304 to read the next input code segment.

In some embodiments, the computing device 100 may recursively apply the same optimization to the code segment optimized in block 314. For example, if the resulting inner loop is larger than the minimum loop size, the computing device 100 may tile the inner loop, resulting in three nested loops. Each additional application of this optimization reduces required memory and/or computation complexity on the order of $O(\sqrt{L})$, where L is the number of iterations of the loop that is tiled. This recursive optimization may continue until the size of the inner loop is equal or smaller than the minimum loop size, which may allow the coefficient array for the inner loop to fit within the cache of the target computing device. In some embodiments, to perform this recursive optimization, the computing device may tile the loop repeatedly in block 316. In other embodiments, in block 326 the computing device 100 may push the optimized code segment back into the input instead of generating output code. In those embodiments, the optimized code segment would then be read again as the input code segment in block 304, and the optimization will be repeated until the computing device 100 determines not to optimize the code segment, for example by determining in block 312 that the loop is too small.

As described above, the illustrative compiler 126 performs the parse, optimization, and code generation stages sequentially, including a single pass by the optimizer. In other embodiments, any number of stages may be included, and each stage may make multiple passes through the source code 202. For example, in some embodiments, the compiler 126 may parse the source code 202 into an AST representation, apply optimizations to the AST representation, parse the optimized AST into an intermediate representation, and then apply further optimizations to the intermediate representation. Further, although illustrated as executing sequentially, in other embodiments, the stages may be performed simultaneously or in parallel.

EXAMPLES

Illustrative examples of the technologies disclosed herein are provided below. An embodiment of the technologies may include any one or more, and any combination of, the examples described below.

Example 1 includes a computing device to optimize a source program, the computing device comprising: source code having a code segment including a loop, the loop having a first number of iterations and including an exponential function call having an argument including a loop-invariant complex number multiplied by a loop index; and a compiler having (i) a loop detect module to detect the code segment, (ii) a loop optimize module to optimize the code segment in response to detection of the code segment, and (iii) a code generator module to generate output code as a function of the optimized code segment, wherein the loop optimize module to: tile the loop to generate an outer loop having a second number of iterations and a nested inner loop having a third number of iterations; generate code to calculate a first coefficient array having a number of elements equal to the third number of iterations, wherein each element of the first coefficient array equals an exponential function of the loop-invariant complex number multiplied by a first coefficient array index; generate code to calculate a second coefficient array having a number of elements equal to the second number of iterations, wherein each element of the second coefficient array equals an exponential function of the loop-invariant complex number multiplied by the third number of iterations and a second coefficient array index; and replace the exponential function call with a multiplicative expression of an element of the first coefficient array at an inner loop index multiplied by an element of the second coefficient array at an outer loop index.

Example 2 includes the subject matter of Example 1, and wherein the first number of iterations equals the second number of iterations multiplied by the third number of iterations.

Example 3 includes the subject matter of any of Examples 1 and 2, and wherein (i) the second number of iterations equals the square root of the first number of iterations, and (ii) the third number of iterations equals the square root of the first number of iterations.

Example 4 includes the subject matter of any of Examples 1-3, and wherein to replace the exponential function call comprises to apply a plurality of rewrite rules to the exponential function call.

Example 5 includes the subject matter of any of Examples 1-4, and wherein to apply the plurality of rewrite rules comprises: to rewrite the exponential function call as a first intermediate expression including an exponential function of the loop-invariant complex number, the inner loop index, the outer loop index and the third number of iterations; to rewrite the first intermediate expression as a second intermediate expression including a product of a first exponential function and a second exponential function, the first exponential function of the loop-invariant complex number multiplied by the inner loop index, and the second exponential function of the loop-invariant complex number multiplied by the third number of iterations and the outer loop index; and to rewrite the second intermediate expression as the multiplicative expression.

Example 6 includes the subject matter of any of Examples 1-5, and wherein the loop optimize module is further to generate a conditional statement to determine whether the first number of iterations exceeds a minimum loop size, the conditional statement to execute the optimized code segment in response to determining the first number of iterations exceeds the minimum loop size.

Example 7 includes the subject matter of any of Examples 1-6, and wherein to determine whether the first number of iterations exceeds the minimum loop size comprises to determine whether an iteration space of the loop exceeds a cache size of the computing device.

Example 8 includes the subject matter of any of Examples 1-7, and the loop optimize module is further to: determine whether the first number of iterations exceeds a minimum loop size; wherein the loop optimize module is to optimize the code segment in response to a determination that the first number of iterations exceeds the minimum loop size.

Example 9 includes the subject matter of any of Examples 1-8, and wherein to determine whether the first number of iterations exceeds the minimum loop size comprises to determine whether an iteration space of the loop exceeds a cache size of a target computing device.

Example 10 includes the subject matter of any of Examples 1-9, and wherein the loop optimize module is further to: determine one of: whether the second number of iterations exceeds a minimum loop size or the third number of iterations exceeds the minimum loop size; and optimize one of: the outer loop in response to a determination that the second number of iterations exceeds the minimum loop size, or the inner loop in response to a determination that the third number of iterations exceeds the minimum loop size.

Example 11 includes the subject matter of any of Examples 1-10, and wherein to determine whether the second number of iterations or the third number of iterations exceeds the minimum loop size comprises to determine whether an iteration space of the outer loop or an iteration space of the inner loop exceeds a cache size of a target computing device.

Example 12 includes the subject matter of any of Examples 1-11, and wherein the loop optimize module is further to optimize the multiplicative expression.

Example 13 includes the subject matter of any of Examples 1-12, and wherein to optimize the multiplicative expression comprises one of to: vectorize the multiplicative expression or parallelize the multiplicative expression.

Example 14 includes a method for optimizing a source program, the method comprising: detecting, by a compiler, a code segment of the source program having a loop, the loop having a first number of iterations and including an exponential function call having an argument including a loop-invariant complex number multiplied by a loop index; and optimizing, by the compiler, the code segment to generate an optimized code segment in response to detecting the code segment, wherein optimizing the code segment comprises: (i) tiling the loop to generate an outer loop having a second number of iterations and a nested inner loop having a third number of iterations; (ii) generating code to pre-calculate a first coefficient array based on an exponential function of the loop-invariant complex number multiplied by a first coefficient array index and a second coefficient array based on an exponential function of the loop-invariant complex number multiplied by the third number of iterations and a second coefficient array index; and (iii) replacing the exponential function call with a multiplicative expression of an element of the first coefficient array at an inner loop index multiplied by an element of the second coefficient array at an outer loop index.

Example 15 includes the subject matter of Example 14, and wherein generating code to pre-calculate the first and second coefficient arrays comprises: generating code to calculate the first coefficient array having a number of elements equal to the third number of iterations, wherein each element of the first coefficient array equals the exponential function of the loop-invariant complex number multiplied by the first coefficient array index; and generating code to calculate the second coefficient array having a number of elements equal to the second number of iterations, wherein each element of the second coefficient array equals the exponential function of the loop-invariant complex number multiplied by the third number of iterations and the second coefficient array index.

Example 16 includes the subject matter of any of Examples 14 and 15, and wherein the first number of iterations equals the second number of iterations multiplied by the third number of iterations.

Example 17 includes the subject matter of any of Examples 14-16, and wherein (i) the second number of iterations equals the square root of the first number of iterations, and (ii) the third number of iterations equals the square root of the first number of iterations.

Example 18 includes the subject matter of any of Examples 14-17, and wherein replacing the exponential function call comprises applying a plurality of rewrite rules to the exponential function call.

Example 19 includes the subject matter of any of Examples 14-18, and wherein applying the plurality of rewrite rules comprises: rewriting the exponential function call as a first intermediate expression including an exponential function of the loop-invariant complex number, the inner loop index, the outer loop index and the third number of iterations; rewriting the first intermediate expression as a second intermediate expression including a product of a first exponential function and a second exponential function, the first exponential function of the loop-invariant complex number multiplied by the inner loop index, and the second exponential function of the loop-invariant complex number multiplied by the third number of iterations and the outer loop index; and rewriting the second intermediate expression as the multiplicative expression.

Example 20 includes the subject matter of any of Examples 14-19, and wherein optimizing the code segment further comprises: generating a conditional statement to determine whether the first number of iterations exceeds a minimum loop size, the conditional statement to execute the optimized code segment in response to determining the first number of iterations exceeds the minimum loop size.

Example 21 includes the subject matter of any of Examples 14-20, and wherein to determine whether the first number of iterations exceeds the minimum loop size comprises to determine whether an iteration space of the loop exceeds a cache size of the computing device.

Example 22 includes the subject matter of any of Examples 14-21, and further comprising: determining, by the compiler, whether the first number of iterations exceeds a minimum loop size; wherein optimizing the code segment comprises optimizing the code segment in response to determining the first number of iterations exceeds the minimum loop size.

Example 23 includes the subject matter of any of Examples 14-22, and wherein determining whether the first number of iterations exceeds the minimum loop size comprises determining whether an iteration space of the loop exceeds a cache size of a target computing device.

Example 24 includes the subject matter of any of Examples 14-23, and further comprising: determining, by the compiler, one of: whether the second number of iterations exceeds a minimum loop size or the third number of iterations exceeds the minimum loop size; and optimizing, by the compiler, one of: the outer loop in response to determining the second number of iterations exceeds the minimum loop size, or the inner loop in response to determining the third number of iterations exceeds the minimum loop size.

Example 25 includes the subject matter of any of Examples 14-24, and wherein determining whether the second number of iterations or the third number of iterations exceeds the minimum loop size comprises determining whether an iteration space of the outer loop or an iteration space of the inner loop exceeds a cache size of a target computing device.

Example 26 includes the subject matter of any of Examples 14-25, and wherein optimizing the code segment further comprises optimizing the multiplicative expression.

Example 27 includes the subject matter of any of Examples 14-26, and wherein optimizing the multiplicative expression comprises one of: vectorizing the multiplicative expression or parallelizing the multiplicative expression.

Example 28 includes a computing device comprising: a processor and a memory having stored therein a plurality of instructions that when executed by the processor cause the computing device to perform the method of any of Examples 14-27.

Example 29 includes one or more machine-readable storage media comprising a plurality of instructions stored thereon that in response to being executed result in a computing device performing the method of any of Examples 14-27.

Example 30 includes a computing device comprising means for performing the method of any of Examples 14-27.

The invention claimed is:

1. A computing device to optimize a source program, the computing device comprising:
a processor;
source code having a code segment including a loop, the loop having a first number of iterations and including an exponential function call having an argument including a loop-invariant complex number multiplied by a loop index; and
a memory having a compiler stored therein, wherein the compiler comprises (i) a loop detect module to detect the code segment, (ii) a loop optimize module to optimize the code segment in response to detection of the code segment, and (iii) a code generator module to generate output code as a function of the optimized code segment, wherein the loop optimize module to:
tile the loop to generate an outer loop having a second number of iterations and a nested inner loop having a third number of iterations;
generate code to calculate a first coefficient array having a number of elements equal to the third number of iterations, wherein each element of the first coefficient array equals an exponential function of the loop-invariant complex number multiplied by a first coefficient array index;

generate code to calculate a second coefficient array having a number of elements equal to the second number of iterations, wherein each element of the second coefficient array equals an exponential function of the loop-invariant complex number multiplied by the third number of iterations and a second coefficient array index; and replace the exponential function call with a multiplicative expression of an element of the first coefficient array at an inner loop index multiplied by an element of the second coefficient array at an outer loop index.

2. The computing device of claim 1, wherein the loop optimize module is further to generate a conditional statement to determine whether the first number of iterations exceeds a minimum loop size, the conditional statement to execute the optimized code segment in response to determining the first number of iterations exceeds the minimum loop size.

3. The computing device of claim 2, wherein to determine whether the first number of iterations exceeds the minimum loop size comprises to determine whether an iteration space of the loop exceeds a cache size of the computing device.

4. The computing device of claim 1, the loop optimize module is further to:
determine whether the first number of iterations exceeds a minimum loop size;
wherein the loop optimize module is to optimize the code segment in response to a determination that the first number of iterations exceeds the minimum loop size.

5. The computing device of claim 4, wherein to determine whether the first number of iterations exceeds the minimum loop size comprises to determine whether an iteration space of the loop exceeds a cache size of a target computing device.

6. The computing device of claim 1, wherein the loop optimize module is further to:
determine one of: whether the second number of iterations exceeds a minimum loop size or the third number of iterations exceeds the minimum loop size; and
optimize one of: the outer loop in response to a determination that the second number of iterations exceeds the minimum loop size, or the inner loop in response to a determination that the third number of iterations exceeds the minimum loop size.

7. The computing device of claim 6, wherein to determine whether the second number of iterations or the third number of iterations exceeds the minimum loop size comprises to determine whether an iteration space of the outer loop or an iteration space of the inner loop exceeds a cache size of a target computing device.

8. The computing device of claim 1, wherein the loop optimize module is further to optimize the multiplicative expression.

9. The computing device of claim 8, wherein to optimize the multiplicative expression comprises one of to: vectorize the multiplicative expression or parallelize the multiplicative expression.

10. A method for optimizing a source program on a computing device comprising a processor and a memory, the method comprising:
detecting, by a compiler of the computing device, a code segment of the source program having a loop, the loop having a first number of iterations and including an exponential function call having an argument including a loop-invariant complex number multiplied by a loop index; and optimizing, by the compiler, the code segment to generate an optimized code segment in response to detecting the code segment, wherein optimizing the code segment comprises:
(i) tiling the loop to generate an outer loop having a second number of iterations and a nested inner loop having a third number of iterations;
(ii) generating code to calculate the first coefficient array having a number of elements equal to the third number of iterations, wherein each element of the first coefficient array equals the exponential function of the loop-invariant complex number multiplied by the first coefficient array index;
(iii) generating code to calculate the second coefficient array having a number of elements equal to the second number of iterations, wherein each element of the second coefficient array equals the exponential function of the loop-invariant complex number multiplied by the third number of iterations and the second coefficient array index;
(iv) replacing the exponential function call with a multiplicative expression of an element of the first coefficient array at an inner loop index multiplied by an element of the second coefficient array at an outer loop index.

11. The method of claim 10, wherein optimizing the code segment further comprises:
generating a conditional statement to determine whether the first number of iterations exceeds a minimum loop size, the conditional statement to execute the optimized code segment in response to determining the first number of iterations exceeds the minimum loop size.

12. The method of claim 10, further comprising:
determining, by the compiler, whether the first number of iterations exceeds a minimum loop size;
wherein optimizing the code segment comprises optimizing the code segment in response to determining the first number of iterations exceeds the minimum loop size.

13. The method of claim 10, further comprising:
determining, by the compiler, one of: whether the second number of iterations exceeds a minimum loop size or the third number of iterations exceeds the minimum loop size; and
optimizing, by the compiler, one of: the outer loop in response to determining the second number of iterations exceeds the minimum loop size, or the inner loop in response to determining the third number of iterations exceeds the minimum loop size.

14. The method of claim 10, wherein optimizing the code segment further comprises optimizing the multiplicative expression.

15. One or more non-transitory, machine readable storage media comprising a plurality of instructions that in response to being executed cause a computing device to:
detect, by a compiler, a code segment of a source program having a loop, the loop having a first number of iterations and including an exponential function call having an argument including a loop-invariant complex number multiplied by a loop index; and
optimize, by the compiler, the code segment to generate an optimized code segment in response to detecting the code segment, wherein to optimize the code segment comprises to:
(i) tile the loop to generate an outer loop having a second number of iterations and a nested inner loop having a third number of iterations;
(ii) generate code to calculate a first coefficient array having a number of elements equal to the third number of iterations, wherein each element of the first coefficient array equals an exponential function of the loop-invariant complex number multiplied by the first coefficient array index;

(iii) generate code to calculate a second coefficient array having a number of elements equal to the second number of iterations, wherein each element of the second coefficient array equals an exponential function of the loop-invariant complex number multiplied by the third number of iterations and the second coefficient array index; and (iv) replace the exponential function call with a multiplicative expression of an element of the first coefficient array at an inner loop index multiplied by an element of the second coefficient array at an outer loop index.

16. The one or more non-transitory, machine readable media of claim 15, wherein to optimize the code segment further comprises to generate a conditional statement to determine whether the first number of iterations exceeds a minimum loop size, the conditional statement to execute the optimized code segment in response to determining the first number of iterations exceeds the minimum loop size.

17. The one or more non-transitory, machine readable media of claim 15, further comprising a plurality of instructions that in response to being executed cause the computing device to:

determine, by the compiler, whether the first number of iterations exceeds a minimum loop size;

wherein to optimize the code segment comprises to optimize the code segment in response to determining the first number of iterations exceeds the minimum loop size.

18. The one or more non-transitory, machine readable media of claim 15, further comprising a plurality of instructions that in response to being executed cause the computing device to:

determine, by the compiler, one of: whether the second number of iterations exceeds a minimum loop size or the third number of iterations exceeds the minimum loop size; and optimize, by the compiler, one of: the outer loop in response to determining the second number of iterations exceeds the minimum loop size, or the inner loop in response to determining the third number of iterations exceeds the minimum loop size.

19. The one or more non-transitory, machine readable media of claim 15, wherein to optimize the code segment further comprises to optimize the multiplicative expression.

* * * * *